United States Patent Office  3,526,778
Patented Sept. 1, 1970

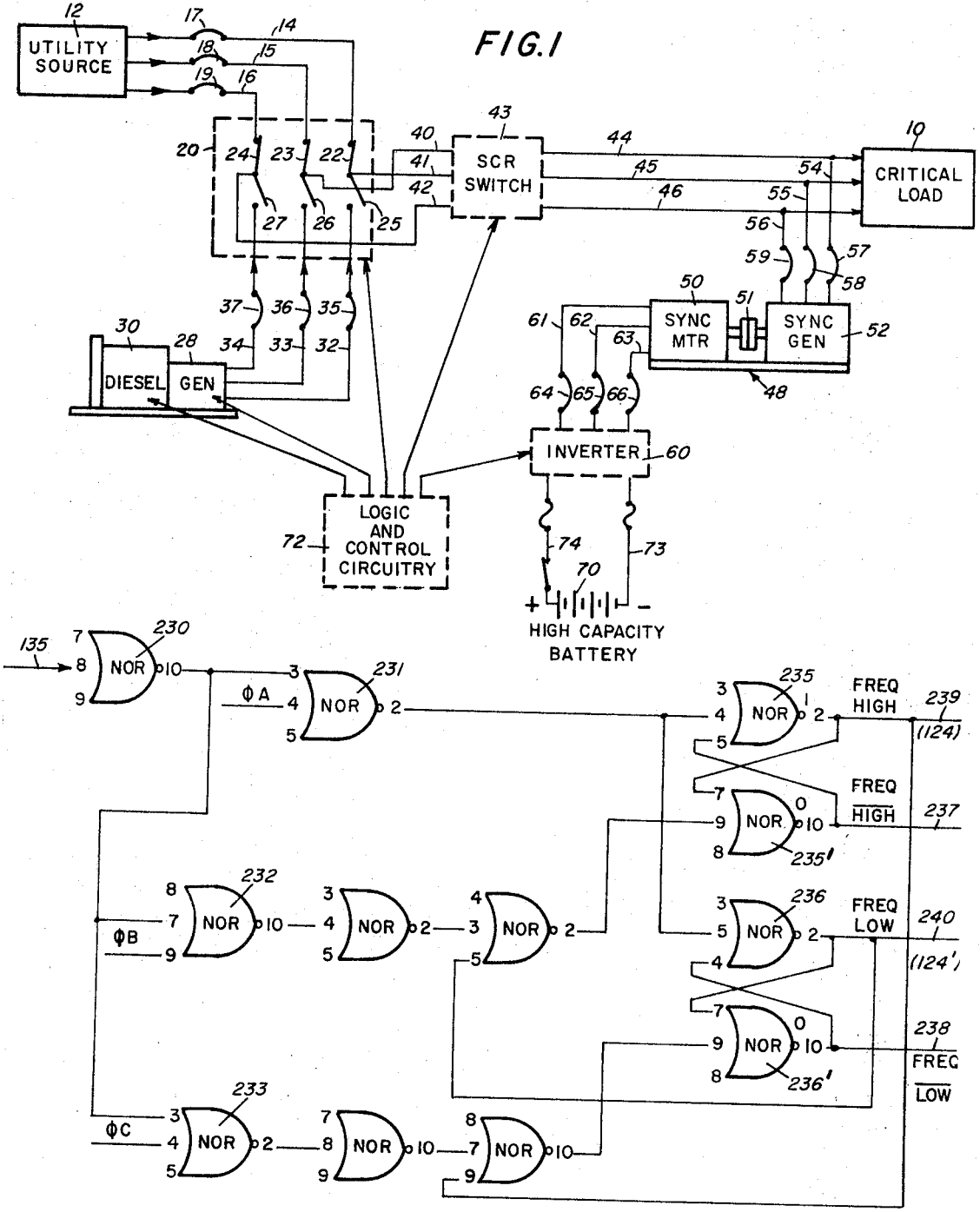

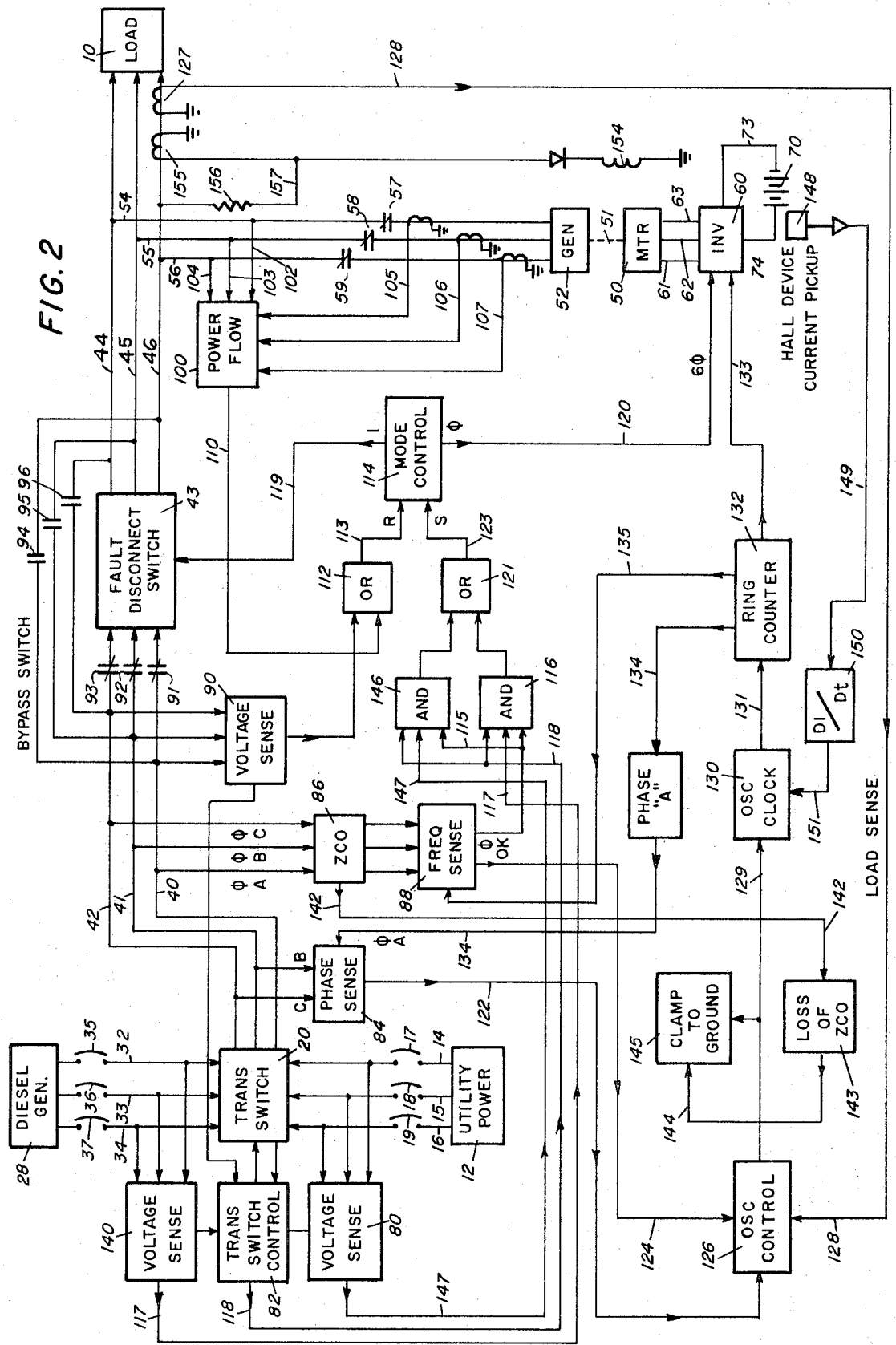

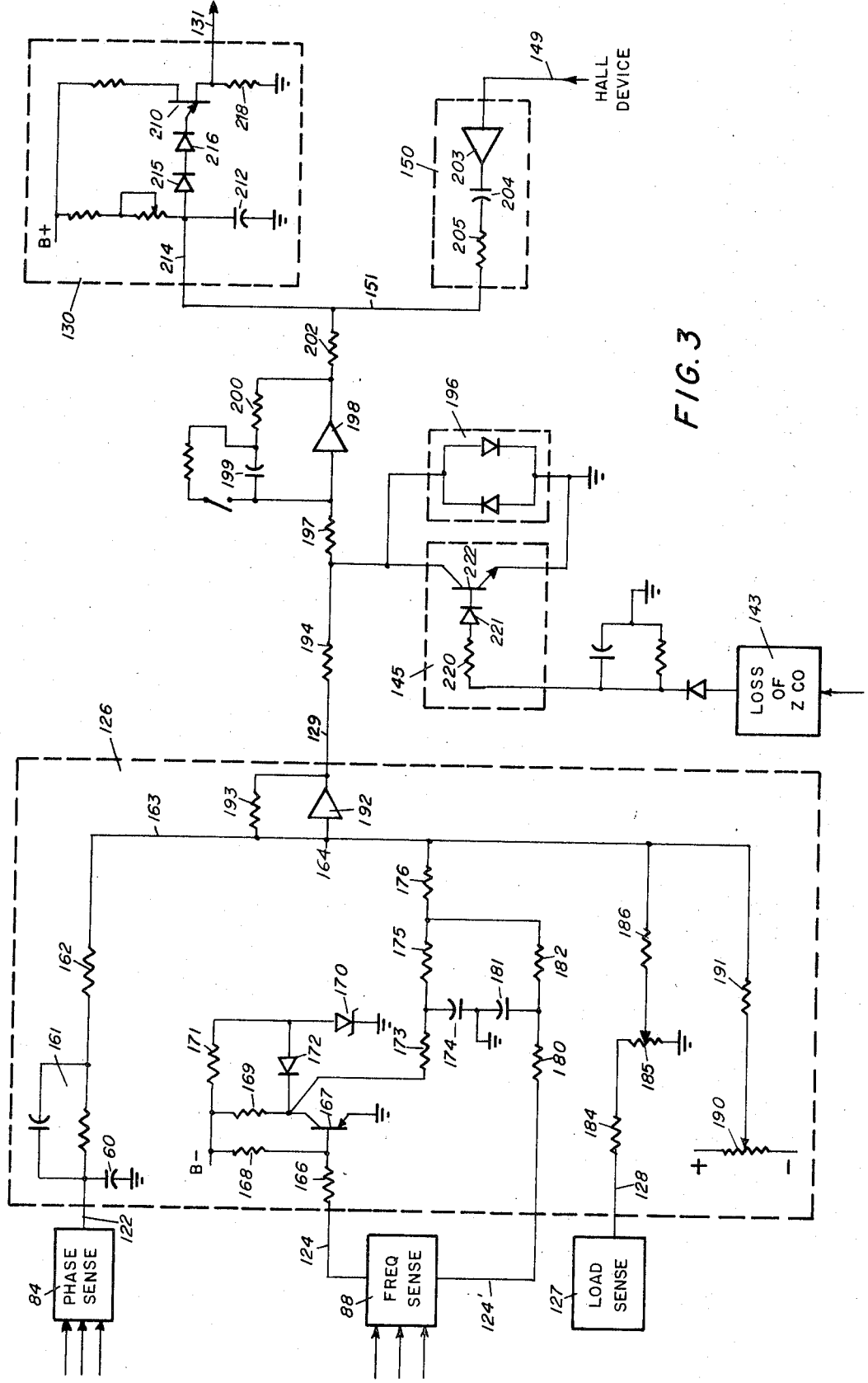

3,526,778
NO-BREAK POWER SYSTEM
Leon B. Crocker and Robert Carter, Richmond, Ralph A. Amos, Bon Aire, and E. John Le Proux and Charles A. Gregory, Jr., Richmond, Va., assignors to Power Systems and Controls, Incorporated, Richmond, Va., a corporation of Virginia
Filed Aug. 4, 1967, Ser. No. 658,398
Int. Cl. F02n *11/08*
U.S. Cl. 290—30                                27 Claims

ABSTRACT OF THE DISCLOSURE

A standby power supply system wherein a load is normally connected to a utility source, and having a synchronous motor-synchronous generator set floating on the line. Upon occurrence of a fault in the utility source, the synchronous motor is instantaneously energized by an inverter which is supplied by a high capacity battery and controlled by an oscillator which is maintained in phase with the utility power. Upon energization of the stand-by motor-generator set, an auxiliary generator operated by a prime mover is energized and brought up to rated frequency and voltage. The inverter is brought in phase with the auxiliary generator and the load is shifted to the auxiliary supply. The inverter is turned off and power flows from the auxiliary source to the load, with the motor-generator set floating on the line, as before. When the utility power returns, the load is again shifted to the standby supply, the standby is brought into phase with the utility supply, and the load is shifted back to the utility.

FIELD OF THE INVENTION

The present invention generally relates to standby power supply systems, and particularly to such power systems which utilize motor-generator sets floating on the utility line. In the present invention, the motor-generator set is made up of synchronous machines, the generator being driven as a motor until power fails, at which time it instantaneously becomes a generator. Control means are provided for sensing faults in the utility line and for responding thereto to operate the synchronous machines through a solid state inverter. This standby operation continues until an auxiliary source can be energized, at which time the system is switched to the auxiliary source. A return to the utility supply source is accomplished by reversing this process.

BACKGROUND OF THE INVENTION

A serious problem exists in the operation of any equipment of a type that requires continuous energization, for as long as the possibility of a power failure is present, whether it be a large scale failure or a locally caused fault, there is uncertainty as to the reliability of such equipment. Although in many cases a slight pause in electric service is not objectionable, there are increasing numbers of applications where continuous supply is critical. For example, an electronic computer which relies on a continuous power supply to maintain data storage can be seriously affected by a loss of energization, for such a loss would result in destruction of all its stored information. Even an instantaneous loss of power could be sufficient to completely wipe out the information. Similarly, a very brief power failure could completely disrupt a communication system, particularly where the loss of even a small amount of information would invalidate the complete message, resulting in loss of time, money, or even life. A landing control system at an airport cannot afford to be without power even for a brief moment, for such systems must maintain continuous monitoring and/or contact to insure the safe operation of the system. Many other uses of electric power, where continuous supplies are critical, will be apparent to those familiar with such problems.

Many methods have been devised in the past in an effort to provide an effective and efficient standby power supply system. The earliest attempts at this utilized large banks of batteries which would serve to supply load requirements for a short period of time. However, although such systems were satisfactory for lighting arrangements and the like, the cost and trouble of maintaining such systems to keep them in good repair and fully charged made them impractical. Further, the serious power limitations of such power banks of batteries make them unsatisfactory for most uses.

Another method that has been tried is the use of high inertia devices, such as flywheels, which are continuously rotated by motor-generator machines floating on the utility line. Upon failure of the utility power, the inertia of the flywheel carries the generator until an auxiliary prime mover can be energized to take over the generation. Such systems were, in many respects, a distinct improvement over the banks of batteries, but presented their own problems, for the maintenance and lubrication of bearings and the like for heavy flywheels is a continuous problem. Further, any slight delay in the ignition of the auxiliary prime mover results in an undesirable decay in the energy produced by the generator and applied to the load. The efficiency of such systems is relatively low, for much power is consumed in maintaining the rotation of the flywheel.

Other, more sophisticated, systems have been devised to overcome the problems left unsolved by these methods, but none have been able to provide the continuity required by sensitive loads in combination with the efficiency that would make them commercially attractive. Furthermore, none of these systems has adequately solved the problem of providing both short term and long term standby capabilities with a minimum disturbance in the load current and voltage. Some systems are able to provide immediate standby power, but are only capable of providing such power for a short period of time. Those systems which are capable of providing long term standby power generally involve the use of internal combustion engines or the like which have a relatively long starting time and thus are inherently incapable of producing an immediate response to the failure of the utility supply.

SUMMARY OF THE INVENTION

It is, therefore, an object of the invention to overcome the disadvantages of the prior art and to provide a standby power supply system that is efficient, and thus inexpensive to operate, yet responds instantaneously to a fault condition to provide the required power over a long period of time with virtually no change in load voltage or load current, and only a slight, but gradual, variation in load frequency.

It is a further object of the invention to provide a standby power system utilizing a synchronous motor-generator set floating across the load line when power is being supplied in the normal manner from a utility source, but which instantaneously replaces the utility supply upon occurrence of a fault condition.

A further object of the invention is the provision of a standby power supply utilizing a synchronous motor-generator set, wherein the motor is normally deenergized, but during operation of the system is energized through a solid-state inverter by a battery supply until an auxiliary prime mover supply can be energized and brought up to speed, the battery supply providing instantaneous short-term standby power and the auxiliary prime mover supply providing long-term capability.

Another object of the invention is to provide a synchronous motor-generator standby power supply wherein the motor is energized by a silicon controlled rectifier inverter, the synchronous motor being operated with a leading power factor to eliminate the need for additional means of commutation in the motor or inverter, the leading power factor providing the necessary commutation.

A further object of the invention is to provide a synchronous motor-generator set having solid-state logic circuitry for sensing the condition of the utility power supply, transferring the system to its standby power supply, turning on an auxiliary power supply to take over from the standby, and, upon restoration of utility power for a predetermined period, returning the system to the standby supply and then to the utility power.

Briefly, the system comprises a load which normally is connected to a utility power supply line through a transfer switch and through a silicon controlled rectifier fault disconnect switch. A pair of mechanically coupled synchronous machines connected as a motor-generator set is connected to float on the load line. The synchronous motor normally is deenergized but the synchronous generator, being connected to the load, derives power from the utility source and operates as a motor to rotate the motor-generator set at synchronous speed. The synchronous motor is connected through an inverter to a high capacity battery power supply, but the inverter is turned off so the motor is not energized. The system control circuitry includes means for sensing the voltage, phase and frequency of the power being supplied to the line, and includes oscillator means for operating the inverter. This oscillator runs in phase with the utility supply. Through the use of solid-state control circuitry and the use of synchronous machines floating on the line, very little power is drawn from the utility, with a consequent high efficiency during normal operation.

Upon occurrence of a fault in the incoming utility power, the sensing means in the control circuitry responds to turn off the silicon controlled rectifier fault disconnect switch in the utility line and turn on the inverter which supplies the synchronous motor. Since this motor already is rotating at synchronous speed and the inverter is being driven by an oscillator which is in phase with the power supply, the motor-generator set instantaneously supplies power of the proper frequency, phase, current and voltage. The fault disconnect switch isolates the load and the standby system from the utility fault, thus preventing undue drain on the standby system. The control circuitry also responds to the fault to start the auxiliary power supply system, which may be a diesel-driven generator, and operates the transfer switch to remove the utility power supply from the line and connect the auxiliary generator. After the auxiliary generator is brought up to rated frequency and voltage, the control system shifts the phase and frequency of the oscillator until the inverter is in phase with the auxiliary generator. At this time, the fault disconnect switch is closed and the inverter is turned off, shifting the load to the auxiliary generator. This method of shifting to the auxiliary supply eliminates all need for mechanical paralleling between a diesel and a rotating mechanical energy system. No inefficient eddy-current clutches or high maintenance mechanical clutching arrangements are used, nor is there any slow frequency decay, as is often the case with flywheel systems.

Once the auxiliary generator is carrying the load, the standby motor is deenergized, and the standby generator floats on the line, driving the motor at synchronous speed. The system can be operated indefinitely from the diesel generator source, providing the long-term capability which is required in the event of a major power failure. The diesel generator can also be oversized to supply non-critical standby requirements for considerable overall systems savings.

Upon restoration of utility power, the synchronous motor-generator set is again energized to supply the load from the standby source, and the fault disconnect switch is turned off. The auxiliary generator is shut down and the transfer switch shifts over to the utility power. The control circuitry then senses the phase and frequency of the utility power and shifts the oscillator until the inverter phase matches that of the utility power. The fault disconnect switch is then closed and the inverter turned off and the load is back on utility power.

BRIEF DESCRIPTION OF THE DRAWINGS

The foregoing and other objects and features of the present invention will be more fully understood and appreciated from a reference to the following description and claims, taken in conjunction with the accompanying drawings in which:

FIG. 1 is a simplified diagrammatic illustration of the system of the invention;

FIG. 2 is a schematic block diagram of the system of the invention, showing the major features of the standby power supply and its control circuitry;

FIG. 3 is a schematic circuit diagram of the frequency clock oscillator and its control circuitry; and FIG. 4 is a diagrammatic illustration of a suitable frequency sensing circuit that may be used in the present system.

DESCRIPTION OF THE PREFERRED EMBODIMENT

Referring now to FIG. 1 of the drawings, there is illustrated a system in accordance with the present invention wherein a load 10 is normally supplied with power from a utility source 12. The power flow from the source is through the three-phase utility lines 14, 15 and 16 which include suitable circuit breakers 17, 18 and 19, respectively, to a transfer switch 20. The transfer switch includes normally-closed switch contacts 22, 23, and 24 and normally-open switch contacts 25, 26 and 27 which serve to connect either the utility source 12 or an auxiliary source 28 to the load.

Auxiliary source 28 comprises a three-phase generator of a capacity suitable for the load which it is to supply, driven by a prime mover such as a diesel engine 30. The generator is connected to the transfer switch 20 by way of auxiliary supply lines 32, 33 and 34 which include circuit breakers 35, 36 and 37, respectively. Under normal conditions, the diesel engine is shut down and no power is supplied to lines 32, 33 and 34.

Utility power from the transfer switch is applied to power supply lines 40, 41 and 42 which may be of any desired length, thus permitting the auxiliary power supply to be located at a place remote from the load and the standby system. The power is supplied to a silicon controlled rectifier switch 43 which, when closed, permits passage of power through load lines 44, 45 and 46 to the critical load 10. By controlling the gates of the SCR's which make up switch 43 so that they are triggered only for line current which is in phase with voltage, power flow through switch 43 is limited to one direction as is the case in the equivalent D.C. circuit which utilizes a diode to prevent backflow of power.

A portion of the power carried by the load lines 44, 45 and 46 is diverted to a motor-generator set 48 which is floating on the load line. The motor-generator set includes a synchronous motor 50 mechanically connected by way of coupling 51 to a synchronous generator 52, the generator being connected by way of lines 54, 55 and 56 to the load lines 44, 45 and 46, respectively, through suitable circuit breakers 57, 58 and 59. Under normal conditions, the synchronous generator receives power from the load lines, and thus is driven as a synchronous motor at synchronous speed. Since the only load on the synchronous generator is the motor 50, the generator is said to "float" on the line, and the power consumed by the motor generator set 48 is relatively small.

The synchronous motor 50 is connected to a solid-state inverter 60 by way of lines 61, 62 and 63 containing suitable circuit breakers 64, 65, and 66, respectively. Inverter 60 comprises six silicon controlled rectifiers in a three-phase, full wave bridge configuration, with its three A.C. connections going to the motor leads. The two D.C. connections of the inverter are connected to the terminals of a high capacity battery 70. The control, or gate, electrodes of the SCR's are energized in sequence by suitable logic and control circuitry 72, to be described. Battery 70 is connected to the inverter through lines 73 and 74, both lines being fused to protect against overloading the inverter.

The logic and control circuitry 72 serves to operate not only the inverter 60 but the silicon controlled rectifier fault disconnect switch 43, the transfer switch 20, the auxiliary generator 28 and prime mover 30 in accordance with the requirements of the system. The control circuits insure the proper sequence of operation upon the occurrence of a fault and upon the restoration of utility power after the fault is cleared up.

If a fault occurs in the utility lines, the power applied to the load will begin to decrease. Instantaneously, the synchronous generator 52 floating across the line will experience a reversal of current, and will begin to operate as a generator to supply current to the load. As soon as this happens, the logic and control circuitry 72 responds to turn on the inverter 60, providing three phase current to drive the synchronous motor 50 and thus to continue the generation of power by the synchronous generator 52. At the same time, circuitry 72 opens the switch 43 to disconnect the utility source from the load. Since the control circuitry 72 follows the phase and frequency of the utility source as long as that source is in operation, the standby system will be immediately in step with the utility when the inverter is turned on, thus permitting the motor-generator set to take over as a standby power supply without a break in the current being supplied to the load. Since the synchronous generator was floating across the load line it was of necessity in phase with the utility power and remains so when it shifts to its generating function.

When switch 43 is opened, the diesel prime mover is started up and the generator 28 brought up to speed, thereby producing the proper voltage and current for the load 10. The transfer switch 20 can then be operated to close the normally-open contacts 25, 26 and 27 and, after the inverter is brought into phase with the auxiliary source, the fault disconnect switch 43 can be closed to connect the generator 28 to load 10. At the same time, inverter 60 will be turned off to deenergize synchronous motor 50 and permit synchronous generator 52 again to float across the line. The load can be supplied in this manner indefinitely.

When the utility source is restored, control circuitry 72 operates to turn on inverter 60, which is operating in phase with the auxiliary power appearing in the power supply lines 40, 41 and 42. Turning on the inverter causes the standby motor-generator set 48 to take over the supply of load 10 and permits fault disconnect switch 43 to be opened. The diesel 30 and generator 28 may then be shut down and transfer switch 20 operated to reclose contacts 22, 23, and 24. The inverter 60 is again shifted, if necessary, to bring it into phase with the utility source, and switch 43 is closed, permitting the utility source to supply the load 10 once again. Inverter 60 is shut down and the motor-generator set 48 goes back to its standby condition.

Turning now to a more detailed description of the invention, reference is made to FIG. 2 of the drawings, which discloses the circuitry of the system in block diagram form. Elements common to both FIGS. 1 and 2 are indicated by the same number.

To again follow the flow of current from the utility source 12 to the load 10, in order to more clearly illustrate the operation of the control circuitry in the system, current flows through utility lines 14, 15 and 16 and the utility circuit breaker contacts 17, 18 and 19 to the transfer switch 20. A voltage sensor 80 is connected to these lines to check for utility voltage. The control circuitry for the electrically operated double throw transfer switch 20 is illustrated in block diagram form at 82, the transfer switch control circuitry being conventional and not a part of the present invention.

On the load side of the transfer switch, a phase sensing circuit 84 picks up phases B and C of the three-phase current from supply lines 41 and 42, respectively, for comparison with a phase A signal generated by the circuitry which controls inverter 60. Also connected to the supply line is a zero crossover (ZCO) network 86 which senses the sequence of the positive-going voltage in each of phases A, B and C at the zero crossover points of their respective wave forms. Thus, when the phase A wave form crosses zero, this is sensed by network 86; similarly the network senses when phases B and C cross their zero point. The zero crossover outputs are applied to a frequency sensing network 88 to provide an indication of the frequency of the supply voltage.

A second voltage sensing network 90 is connected to the supply lines 40, 41 and 42 to determine the presence of a supply voltage. This network incorporates an adjustable time delay of, for example, three seconds, which operates upon the loss of voltage in the supply lines to insure that the voltage loss is relatively permanent before a switching operation takes place. Finally, the supply lines 40, 41 and 42 include series contactor switches 91, 92 and 93 which may be slaved to the fault disconnect switch 43 to insure a positive opening of the lines when a fault condition occurs.

Bypass switch means 94, 95 and 96 are connected across switch 43 for use in starting the system. The use of a bypass switch eliminates the need for use in the switch 43 of silicon controlled rectifiers having a current capability sufficient to handle the starting current for synchronous generator 52. Since the SCR's in switch 43 need only handle normal operating current, a reduction in the cost of the system is obtained. Once the system is started, the bypass switches have no further function and normally remain open. From the fault disconnect switch, the three phase load line goes directly to the load 10 and also branches off to the synchronous generator 52 through lines 54, 55 and 56 and normally closed contacts 57, 58 and 59. Between the load and generator 52 is connected a power flow sensor 100 which detects the vector of current flow between the generator and the load lines which is in phase with the voltage.

The power flow detector 100 comprises a conventional phase sensing discriminator having three input voltage connections 102, 103 and 104 and three input current-sensing connections 105, 106 and 107, both sets of connections being connected to lines 54, 55 and 56, respectively. When current is flowing from the load lines into the generator 52 so that this generator is floating across the line and acting as a motor, the relationship between the current and voltage vectors is in one direction. However, when the utility source fails, and synchronous machine 52 begins to operate as a generator, the current vector will be shifted by 180°, thus producing an output on line 110 which may be used to activate the standby power supply system. Since this reversal of the current vector is instantaneous upon failure of the supply source, the power flow detector 100 reacts immediately to the failure and produces an output signal. This output signal is fed to an OR circuit 112 which, in turn, produces an output signal by way of line 113 to the "reset" input of a mode control flip-flop circuit 114. Upon reset of the flip-flop circuit, an output signal appears on line 119, which signal is applied to the fault disconnect switch 43 to open it and disconnect the load from the utility source. The signal at the opposite output of flip-flop 114 appears simultaneously and is applied by way of line 120 to the inverter 60, turning this inverter on.

Switch 43, as has been noted, includes gate control circuitry for regulating the conductivity of the silicon controlled rectifiers. This circuitry triggers the SCR's on only for current in phase with voltage so that power can flow only in one direction—from the source to the load. With this arrangement, each SCR is conductive only for one-half cycle, and is turned off for the other half of the cycle. Thus, when a power reversal is detected by power flow sensor 100, the control circuitry for switch 43 does not simply turn off all the SCR gates, but, instead, prevents the triggering of the SCR's for their next half-cycle of conductivity. This results in a faster-acting disconnection and saves one-half cycle of possible short circuit on the utility.

Whenever there is a voltage on supply lines 40, 41 and 42, phase sensing circuit 84 and frequency sensing network 88 provide output signals on lines 122 and 124, respectively, which are applied to an oscillator control network 126. Also applied to the oscillator control network 126 is a load offset angle signal which is derived from a current transformer 127 on load line 46 and is fed through line 128 to affect the oscillator control. The output of oscillator control network 126 is applied by way of line 129 to the clock oscillator 130. The output pulses from the clock oscillator are carried by line 131 to a ring counter 132 which responds to these output pulses to produce a 6-phase output signal on line 133 which is applied sequentially to the control electrodes of the six silicon controlled rectifiers which make up the inverter 60.

Two feedback circuits are provided from the ring counter network 132. One output is a phase A output which is applied by line 134 to the phase sensing network 84. The output of network 84 appears on line 122 and is applied to the oscillator control network 126 to assure that the phase sequence of the ring counter corresponds to that of the power carried by lines 40, 41 and 42. The second feedback from the ring counter is applied by way of line 135 to the frequency network 88. This signal, which is derived from a selected gate circuit in the counter, is compared in the frequency sensing network with the corresponding signal from the zero crossover network. Thus, if the feedback on line 135 corresponds to the crossover of phase A in the ring counter, as is the case in the preferred embodiment, the frequency sensing network will provide an error signal on line 124 if this feedback signal should occur at the time of zero crossover of either phase B or phase C. Such a mismatch occurs when the oscillator is not running at a frequency corresponding to that of the power being supplied to the supply lines 40, 41 and 42, whether that power be from the utility or auxiliary source. In this manner, the oscillator is maintained at a frequency that will coincide with that of the transmitted power, and will drive the ring counter in phase with that power.

By reason of this operation of the clock oscillator, the standby power supply picks up where the utility source stopped, even if it is in the middle of a cycle. Each phase of the inverter 60 immediately comes under the control of the oscillator and ring counter upon failure of the utility power, and the inverter immediately starts to chop the direct current power from battery 70 to produce a three-phase alternating current for motor 50. The motor then drives generator 50 to supply standby power to load 10.

If the utility power does not return within a predetermined time, then the transfer control 82 will start up the diesel and its generator 28. The output voltage from generator 28 appearing on lines 32, 33 and 34 is detected by a voltage sensing network 140, and when this network indicates that the diesel is up to speed and furnishing the proper voltage, the transfer switch control 82 will respond to throw the transfer switch 20 over to the auxiliary supply lines. This will apply a voltage to lines 40, 41 and 42, but not to the load, for the SCR switch 43 is open. In order to provide faster response in the system, it may be desired to start the auxiliary source immediately upon failure of the utility source, and to connect the auxiliary generator to lines 40, 41 and 42 without waiting for it to come up to its rated output. In the preferred embodiment of the invention, this latter mode of operation is used. At the appearance of this auxiliary voltage, the phase sensing network 84, the zero crossover network 86 and the voltage sensing network 140 begin to prepare the system for a transfer from the standby source to the auxiliary source. Networks 84 and 86 will operate gradually to shift the phase of oscillator 130 and to bring its frequency into step with that of the diesel generator 28. As soon as any phase and frequency error has been corrected, an output from frequency sensing network 88 will appear on line 115 which will be applied to one input of an AND circuit 116. The presence of a voltage on lines 32, 33 and 34, as detected by voltage sensing network 140, will supply second input to AND circuit 116 by way of line 117. The transfer switch 20, when in the "auxiliary" position, will provide a third input to AND circuit 116 by way of transfer control circuit 82 and line 118. The presence of signals at all the inputs of AND circuit 116 will result in an output pulse which will be fed through an OR gate 121 and line 123 to the "Set" input of mode control flip-flop 114. This will cause the flip-flop to produce output signals which will simultaneously close the switch 43 and cut off the inverter 60, thus shifting the load from the standby generator 52 to the auxiliary generator 28.

By controlling the frequency and phase of the clock oscillator 130 at all times that there is a voltage on lines 40, 41 and 42, the voltage produced by the inverter 60 and thus by the standby source will always be exactly in phase with the utility or auxiliary source at the moment of transfer to or from the standby generator. This permits paralleling of sources by the high speed fault disconnect switch 43 with no loss of continuity in the wave form applied to the load.

Whenever there is a voltage on lines 40, 41 and 42, there is a zero crossover, resulting in a positive signal on ZCO output line 142. This signal is sensed by the loss of zero crossover circuit 143, and when the signal is lost, due to a loss of voltage in the supply lines and thus a loss of zero crossover, an output signal is produced on line 144 which closes a switch 145 to clamp the output line 129 from oscillator control 126 to ground potential, thus disconnecting the control circuitry from oscillator 130. This permits the oscillator to become free-running at any predetermined frequency during the period of no voltage on the transmission lines. When voltage is restored to the lines, the zero crossover circuit reconnects the control circuitry to the oscillator and the oscillator is brought into step with that voltage.

When the utility power is restored at source 12, and a voltage appears on lines 14, 15 and 16, the load is returned to the utility supply source. This is accomplished by first shifting to the standby motor-generator set 48, bringing the frequency and phase of the generator 52 into step with that of the utility source, and then shifting to the utility source. The initial step of shifting to the standby power supply may be accomplished in one of several ways. Preferably, means are provided to respond to the voltage sensing network 80 to open the fault disconnect switch 43 after a three minute delay which insures that the utility voltage is steady. Opening of switch 43 causes the system immediately to shift to the standby source 52. With the switch 43 open and the utility source voltage at its proper level, the transfer switch 20 may be shifted to connect the utility source to supply lines 40, 41 and 42. The phase sensing network 84 and the zero crossover network 86 respond to this voltage in the manner described above to energize the oscillator control circuit 126, remove the clamp 145 and bring the clock oscillator 130 under the control of circuit 126. The oscillator is then brought into step with the utility supply, and when this occurs a signal appears on line 115 to energize one of the inputs of an AND circuit 146. Additional inputs to AND circuit 146 are obtained from voltage sensing network 80, by way of line 147, and transfer switch 20, by way of transfer control 82 and line 118. AND circuit 146 produces, in the presence of all of these input signals, an output pulse which is fed through OR circuit 121 to the "set" input of mode control circuit 114. Switch 43 is then closed to connect the load 10 to the utility source 12, as described above, while simultaneously shutting down inverter 60.

An important feature of the oscillator control not heretofore mentioned is the provision of a Hall effect device 148 which senses the current flow from battery 70 to inverter 60. The Hall device produces a current in line 149 which passes through a differentiating network 150, the derivative of the signal then being fed back to the oscillator 130. This differentiating feedback loop gives the oscillator some "softness" in driving the synchronous motor 50 and thus stabilizes the system. If the current from the battery starts to increase, the Hall device will provide a signal which retards the phase angle of the oscillator slightly to compensate for the battery current rise. This compensation gives the clock oscillator the equivalent of "droop" that one would have in a generator supplying the driving energy to the inverter. The feedback loop is necessary because an inverter operating from a battery is a very stiff source of power and a synchronous motor operated from such a source would have a tendency toward instability.

The field winding 154 of synchronous motor 50 is supplied from a current transformer 155 connected to one phase of the load line. The field winding is also supplied by a voltage derived from one of the load lines by way of resistor 156 and line 157. The use of both a current and voltage feed for the field winding assures sufficient excitation under all conditions to maintain a leading power factor in the synchronous motor 50. This leading power factor is necessary in a system where no other means of commutation between a silicon controlled rectifier inverter and a synchronous motor is provided. Commutation means for SCR inverters normally are provided in order to insure that each silicon controlled rectifier in the inverter is cut off at the end of its waveform. In the present system, when the power factor of the motor is leading, the current in the motor goes to zero before the end of the voltage waveform. The zero current automatically cuts off the silicon controlled rectifier, eliminating the need for external cut-off means for the SCR. The discovery that the synchronous motor can be operated from an inverter in this manner is an important feature of the invention, for it permits a great simplification of the control system.

Although many of the circuits in the block diagram of FIG. 2 are conventional and thus well known to the art, selected circuits are illustrated in the remaining figures of the drawings in order to provide further details concerning the operation of the system. Referring now to FIG. 3, the oscillator control circuit 126 is illustrated, with the phase sensing circuitry 84, the frequency sensing network 88 and the load sensing input 128 illustrated in diagrammatic form. The phase sense input is applied by way of line 122 to the junction of a shunt capacitor 160 and a parallel RC network 161. The output of the RC network is applied through resistor 132 and line 163 to a common junction point 164. The phase error signal appearing on line 163 forms a part of the control circuit output signal which will be applied to the oscillator 130.

The output of frequency sensing network 88 comprises two signals, one appearing on line 124 when the frequency of the oscillator is too high and the other appearing on line 124' to indicate that the frequency of the oscillator is too low. The output on line 124 is applied through resistor 166 to the base of a transistor amplifier 167. The base and collector electrodes are connected through resistors 168 and 169, respectively, to a source of bias voltage which is regulated by means of a Zener diode 170 connected by way of a resistor 171 between the bias source and ground. The collector of transistor 167 is connected through a diode 171 to the anode of the Zener diode and is also connected through resistor 173 across a shunt resistor 174 and through series resistors 175 and 176 to the junction point 164. The low frequency signal on line 124' is applied through a resistor 180, across a shunt resistor 181 and through a series resistor 182 to the junction of resistors 175 and 176. The two shunt capacitors 174 and 181 are connected to a common ground point. The signal applied to junction 164 from the frequency sensing network 88 thus has a polarity that corresponds to the direction of change required in the frequency of oscillator 130 to bring it back to the desired frequency.

The load offset angle signal on line 128 is applied through resistor 184, potentiometer 185 and resistor 186 to the common junction point 164. This signal is a feedback from the load which is sensitive to load current variations to damper oscillator variations. Similarly, a control circuit bias signal is obtained from potentiometer 190 and applied through resistor 191 to the junction point 164. This bias voltage sets the initial conditions for the oscillator when the system starts to operate. The condition at summing junction 164 thus is representative of the phase and frequency error of the clock oscillator and serves to provide the required correction. This signal is amplified in the operational amplifier 192 which acts with its feedback resistor 193 as a summer for the various inputs to point 164. The output of the amplifier is supplied by way of line 129 through resistor 194 to the diode clipper circuit 196 which serves to limit the voltage applied through resistor 197 to operational amplifier 198. The amplifier 192 sums the phase error signal, the frequency error signal, the load offset angle signal and the initial bias conditions set by potentiometer 190, all of which comprise the necessary information to control the oscillator. The feedback circuit for amplifier 198 is an integrating circuit comprising capacitor 199 and resistor 200. This integrating circuit serves as a rate-of-change controller to limit the rate of change of frequency or phase in the clock oscillator 130 and its associated ring counter 132. The damping effect of this integrating circuit prevents the control electronics from acting faster than the motor can respond and thus permits the control circuit to lock the oscillator onto the frequency and phase of the power supply.

The output of the integrating amplifier 198 is applied through resistor 202 to the input of the clock oscillator 130. Also appearing at the input of oscillator 130 is the output of the differentiating circuit 150, which circuit includes a series amplifier 203, and a series RC circuit comprising capacitor 204 and resistor 205.

Oscillator 130 is comprised of a uni-junction transistor 210 which operates at a frequency determined by the value of the input shunt capacitor 212 and the magnitude of the charging current applied from the oscillator control circuit 126 by way of input line 214. The charge appearing across capacitor 212 is applied to the emitter of uni-junction transistor 210 through a pair of limiting diodes 215 and 126, this voltage causing the transistor to conduct whenever it reaches a predetermined level. Output pulses are obtained across the base load resistor 218 and appear on output line 131. The uni-junction transistor is suitably biased from a source of B+ in known manner. The output pulses on line 131 are at a frequency which is dependent upon the charging current of the capacitor 212 and thus is controlled by the magnitude of the current appearing on line 214.

It should be noted with regard to the circuit of FIG. 3 that when the zero crossover signals are lost, network 143 produces an output signal which is applied by way of line 144 to the ground clamping circuit 145. This latter circuit comprises an input resistor 220, and a diode 221 connected to the base of a transistor switch 222.

The loss of the zero crossover signal, which is the loss of a positive voltage, results in a negative-going voltage at the base of switch 222 to turn the switch on and ground the junction of resistors 194 and 197. This effectively grounds the output of the oscillator control circuit 126. Under this condition, the only input to oscillator 130 is the derivative of the current supplied by battery 70 and thus oscillator 130 is essentially free-runing.

The ring counter 132 is a conventional array of flip-flops gated to count to six and then start over again. Standard de-coding networks, such as AND circuits or the like, provide the six feeds of cyclic information through lines 133 to sequentially fire the gates of the six silicon controlled rectifiers which make up the 3-phase inverter 60. In the preferred embodiment, the fourth count of the ring counter is used as the feedback to the frequency sensing network 88 and to the phase sensing network 84, this count corresponding to the negative zero crossover of phase A of the three phase power supply.

FIG. 4 is a diagrammatic illustration of a frequency sensing circuit such as that shown at 88 in FIG. 2, which would be suitable for use in the present system. All of the logic elements of this circuit are "NOR" gates. The feedback signal from the fourth count or stage, of the ring counter which appears on line 135 is applied through "NOR" gate 230 to one of the inputs of each of "NOR" gates 231, 232, and 233. The crossover signals from each of phases A, B and C in the positive going direction are fed to the second inputs of gates 231, 232 and 233, respectively. When phase A is present in coincidence with the signal from stage four of the ring counter, a flip-flop circuit composed of the two "NOR" circuits 235 and 235' and the flip-flop circuit composed of the two "NOR" circuits 236 and 236' are reset to zero, producing outputs on the two output lines 237 and 238 which represent that the frequency is not high (freq. $\overline{high}$) and that it is not low (freq. $\overline{low}$). If the oscillator drifts a little and the next coincidence is picked up between the fourth count of the ring counter and phase B, this would reverse flip-flop 235–235' to produce an output on line 239, indicating that the frequency was high. An output would still remain on line 238 indicating that the frequency was not low. If, on the other hand, after a coincidence with the phase A signal, the C phase were to be the next coincidence with stage four of the ring counter, then "NOR" circuit 233 would be energized to reverse flip-flop 236–236' to produce an output on line 240, indicating that the frequency of the oscillator was low.

The phase sensing discriminator may be of conventional design. It is used to detect phase error in the phase sensing circuit 84, and is also used to detect the direction of power flow in the power flow detector 100. In addition, a phase sensing discriminator may be used to sense the power factor of the synchronous motor 50 to permit continuous and automatic control of the motor power factor. However, this is not essential and the present embodiment utilizes an empirical control rather than the discriminator technique. When used in the power flow detector, three conventional discriminator circuits will be required, one for each phase.

It will be apparent to those skilled in the art that other variations and modifications of the system can be made without departing from the principles of the invention as set forth herein. For example, a voltage regulator may be utilized with the synchronous generator 52 in order to insure proper power to the load. Further, battery charging means utilizing the motor 50 may be provided for the standby battery bank 70. When motor 50 is not being used to provide standby power, but is floating on the supply line, it is being driven as an A.C. synchronous generator, and thus is producing useful power. This power may be rectified and utilized to maintain batteries 70 at their desired charge level. Such modifications and changes, however, are within the scope of the invention as set forth in the following claims.

We claim:
1. In a synchronous motor power supply, a source of direct current, a silicon controlled rectifier inverter network connected between said direct current source and said synchronous motor, pulse generating means for applying pulses sequentially to the control electrodes of the silicon controlled rectifiers in said network to sequentially turn on said rectifiers and provide an alternating current waveform for said motor, said motor having a leading power factor, whereby said silicon controlled rectifiers will be commutated without an external commutating source.

2. In a no-break standby power supply system, a source of power, load means connected to said source of power by means of a load line, and standby power supply means comprising a synchronous motor-synchronous generator set floating on said line.

3. The no-break system of claim 24, wherein said synchronous generator is connected to said line and normally operates as a motor to drive said synchronous motor at synchronous speed, said synchronous motor being connected to a normally-off inverter means and thus being normally deenergized, and control means for said system to turn on said inverter and energize said synchronous motor in response to a failure of said source of power, whereby said synchronous generator is driven by said synchronous motor to supply standby power through said load line to said load.

4. The no-break system of claim 3, wherein said control means comprises oscillator means for driving said inverter, and phase sensing and frequency sensing means connected to said source of power for regulating the frequency and phase of said oscillator, said inverter being driven at the frequency of and in phase with said source of power, whereby the energization of said standby power supply will produce no break in the power supplied to said load.

5. The no-break system of claim 3, said inverter comprising a plurality of silicon-controlled rectifiers connected in a three-phase, full-wave bridge configuration and wherein said synchronous motor is operated with a leading power factor, whereby said motor is self-commutating.

6. The no-break system of claim 3, further including silicon controlled rectifier fault disconnect switching means between said source of power and said load, said switching means being normally closed but responsive to said control means to open upon failure of said power supply.

7. The no-break system of claim 6, wherein said fault disconnect switching means operates to permit power flow only from said source of power to said load, said silicon controlled rectifiers being conductive only when the current from said source of power is in phase with its voltage.

8. The no-break system of claim 6, further including transfer switch means and a supply line between said source of power and said silicon controlled rectifier switching means, and a normally deenergized auxiliary source of power connected to said transfer switch means, said transfer switch being operative to connect either said source of power or said auxiliary source of power to said supply line to provide power to said load.

9. The no-break system of claim 8, wherein said control means further comprises means responsive to the failure of said power supply for energizing said auxiliary source of power and operating said transfer switch to connect said auxiliary source of power to said supply line.

10. The no-break system of claim 9, wherein said control means further comprises oscillator means for driving said inverter, and phase sensing and frequency sensing means connected to said supply line for regulating the frequency and phase of said oscillator, said inverter being driven at the frequency of and in phase with the power applied to said supply line, whereby the power supplied by said standby power supply will coincide with the power on said supply line.

11. The no-break system of claim 10, wherein said control means operates to shift said load from said standby source to the source providing power to said supply line upon attainment of phase and frequency coincidence for a predetermined period of time.

12. The no-break system of claim 11, wherein said control means further includes ring counter means driven by said oscillator, said ring counter producing a series of output pulses for gating said inverter to produce the desired frequency and phase of energization for said synchronous motor.

13. The no-break system of claim 12, further including feedback means from said ring counter for comparing the output of said oscillator with said phase sensing and frequency sensing means, whereby error signals are produced to correct the output of said oscillator.

14. The no-break system of claim 10, further including means responsive to the absence of a voltage on said supply line for disabling the regulation of said oscillator, whereby the oscillator becomes free-running until voltage is restored to said supply line.

15. In a no-break power supply system, a primary source of power connected through transfer switch means, supply lines, series switching means and load lines to a load, a normay deenergized auxiliary source of power connected to said transfer switch, and a normally deenergized standby source of power connected to said load lines, power flow sensing means instantaneously responsive to the occurrence of a fault in said primary source to energize said standby source, shift said load to said standby source, and open said series switching means, transfer switch control means responsive to said fault for energizing said auxiliary source and switching it to said supply lines, means for shifting the phase of said standby source to coincide with the phase of the auxiliary power being applied to said supply lines, and means for closing said series switching means and deenergizing said standby source.

16. The no-break system of claim 15, further including means for returning said load to said primary source upon clearance of said fault, said last-named means including means for reenergizing said standby source, deenergizing said auxiliary source and opening said series switching means, thereby shifting said load to said standby source, said transfer switch control means thereafter switching said primary source to said supply line, said means for shifting the phase of said standby source operating to bring the phase of said standby source into coincidence with said primary source, and means responsive to said coincidence for closing said series switching means and deenergizing said standby source to transfer said load back to said primary source.

17. The no-break system of claim 16, wherein said standby source comprises a synchronous motor-generator set, said synchronous motor being normally deenergized, with said generator normally floating on said load line and driving said synchronous motor at synchronous speed.

18. The no-break system of claim 17, wherein said synchronous motor is energized by an inverter, said inverter being gated by an oscillator-driven counter means that is controllable to provide the desired phase and frequency in said standby source.

19. The no-break system of claim 18, wherein said inverter comprises a plurality of silicon controlled rectifiers connected to a source of direct current, the gate electrodes of said rectifiers being sequentially energized by said ring counter to provide an alternating current input to said synchronous motor, said motor operating with a leading power factor to be self-commutating.

20. A standby power supply system having a primary source of power connected through a load line to a load, a synchronous generator electrically connected to said load line in parallel with said primary source and normally driven at synchronous speed as a motor by said primary source, a synchronous motor mechanically coupled to said generator, said motor being electrically connected to a normally-off inverter network, said inverter being electrically connected across a source of direct current, gating means for said inverter, power flow sensing means electrically connected to said synchronous generator, and control means responsive to said power flow sensing means for turning said inverter on, whereby said gating means operates said inverter to provide alternating current to said synchronous motor, causing said motor to drive said generator to supply standby power to said load.

21. The standby power supply of claim 20, wherein said gating means comprises an oscillator driving a counter means, said oscillator being regulated as to phase and frequency whereby said inverter is gated to operate in phase with said primary source even when said inverter is turned off.

22. The standby power supply of claim 20, further including current sensing means for said direct current source, said current sensing means providing the differential of any change in direct current to said oscillator to retard the phase of said oscillator, whereby the operation of said motor is stabilized.

23. The standby power supply of claim 20, wherein said inverter comprises silicon controlled rectifiers and said synchronous motor has a leading power factor, whereby said gating means turns said rectifiers on sequentially and said leading power factor turns said rectifiers off sequentially to provide said alternating current to said synchronous motor.

24. The no-break system of claim 2, wherein said synchronous motor has a leading power factor.

25. The no-break system of claim 24, said standby power supply means further including a standby source of power and a silicon controlled rectifier inverter for producing an alternating current for driving said synchronous motor, the leading power factor of said synchronous motor commutating said inverter.

26. The synchronous motor power supply of claim 1, further including generator means coupled to and driven by said synchronous motor to produce an output alternating current of substantially constant frequency, and means for connecting said generator to an electrical load, thereby to provide standby power.

27. The power supply system of claim 26, further including a source of alternating current power; means responsive to the phase and frequency of said source of alternating current to regulate said pulse generating means, whereby said motor and the output of said generator both are synchronous with said source of alternating current.

References Cited

UNITED STATES PATENTS

| | | | |
|---|---|---|---|
| 2,783,393 | 2/1957 | Lindahl et al. | 290—4 XR |
| 2,920,211 | 1/1960 | Gotoh. | |
| 2,972,056 | 2/1961 | Park et al. | 290—4 XR |
| 3,050,635 | 8/1962 | Tanner | 290—4 XR |
| 3,142,793 | 7/1964 | Grillo. | |
| 3,345,517 | 10/1967 | Smith | 290—4 |
| 3,384,804 | 5/1968 | Salih | 318—138 |
| 3,418,550 | 12/1968 | Kolatorowicz et al. | 318—254 |

GLEN R. SIMMONS, Primary Examiner

U.S. Cl. X.R.

318—138, 171